United States Patent [19]
Yeh et al.

[11] Patent Number: 5,426,537
[45] Date of Patent: Jun. 20, 1995

[54] METHOD AND APPARATUS FOR AUTOMATICALLY ADJUSTING THE OVERSHOOT OF A RECORD HEAD IN RESPONSE TO THE RECORD HEAD GAP DEPTH

[75] Inventors: Nan-Hsiung Yeh, Foster City; Kuo-Nan Yang, Saratoga; Charles R. Olson, Cupertino; George R. Varian, Palo Alto, all of Calif.

[73] Assignee: Ampex Corporation, Redwood City, Calif.

[21] Appl. No.: 85,196

[22] Filed: Jun. 30, 1993

[51] Int. Cl.⁶ .................................... G11B 5/09
[52] U.S. Cl. ............................................. 360/46
[58] Field of Search ............. 360/46, 45, 32, 65, 360/49, 67, 68, 51, 55

[56] References Cited

U.S. PATENT DOCUMENTS

| | | | |
|---|---|---|---|
| 3,618,119 | 11/1971 | Rodriguez | 360/46 |
| 4,479,152 | 10/1984 | Chi | 360/46 |
| 5,047,876 | 9/1991 | Genheimer et al. | 360/46 |
| 5,060,088 | 10/1991 | Dolivo et al. | 360/46 |
| 5,107,378 | 4/1992 | Cronch et al. | 360/46 X |
| 5,121,262 | 6/1992 | Squires et al. | 360/46 |
| 5,241,429 | 8/1993 | Holsinger | 360/46 |

OTHER PUBLICATIONS

"Transition Asymmetry in High Density Digital Recording", by N. Y. Yeh and R. Niedermeyer, Reprinted from IEEE Transactions on Magnetics, vol. 26, No. 5, Sep. 1990.

*Primary Examiner*—Donald Hajec
*Assistant Examiner*—Patrick Wamsley
*Attorney, Agent, or Firm*—John G. Mesaros; George B. Almeida

[57] ABSTRACT

A transition overshoot of the record current is usual to compensate record head efficiency loss at high frequencies. Recording compatibility is achieved by decreasing the record current overshoot at the digital data signal transitions as the head gap depth decreases due to wear. Additionally, the different gap depth record heads of different head efficiencies require different optimum record current levels to provide maximum signal-to-noise ratio in the reproduced signal. The head gap depth thus is monitored by means of the optimum record current level without actually measuring the gap depth. The desired amount of overshoot is adaptively adjusted to the gap depth during the recording process by tracking the overshoot to the optimum record current level derived by adjusting the record drive level signal. Recording compatibility between different gap depth heads is achieved using the existing normal record current optimization process during recording.

27 Claims, 6 Drawing Sheets

METHOD AND APPARATUS FOR AUTOMATICALLY ADJUSTING THE OVERSHOOT OF A RECORD HEAD IN RESPONSE TO THE RECORD HEAD GAP DEPTH

BACKGROUND OF THE INVENTION

The present invention relates to a waveform pre-equalization technique which improves digital signal fidelity, accuracy and recovery when recording/reproducing the digital signal onto/from a recording medium and, more particularly, to a pre-equalization technique used in a recording process, which tracks the record current overshoot occurring at a digital signal transition to an optimum record current level adjusted to the record head gap depth, to thereby adaptively adjust the amount of overshoot to the head gap depth. The record current is controlled by a record drive level signal. Recording compatibility between different gap depth heads when performing, for example, data append or data insert edit processes and the like, thus is achieved when the record current level is optimized.

Equalization techniques performed during reproduction and demodulation processes provide waveform compensation, whereby the equalized amplitude and shape of a digital data signal, comprising a plurality of consecutive isolated waves or digital data bits, is more nearly equal to the amplitude of the digital signal prior to the previous modulation and recording processes. However, digital signal recordings made by record heads of different gap depths, that is, new heads with deep gap depths or old heads with shallow gap depths, exhibit different magnetization patterns representative of the data bits when the signal is recorded on the magnetic medium. In the subsequent reproduction process, the different magnetization patterns usually require different equalizer settings to provide optimum data recovery. The different magnetization patterns also may cause recording compatibility problems in the event that recording media and recorder apparatus are interchanged in subsequent reproduction processes. For example, when reproducing digital data from a recording medium after a data append process in, for example, a data storage system, or after a data insert edit process in a video recording system, wherein the processes are done by different gap depth heads, the bit error rate may increase dramatically due to the sudden change in the reproduced waveform at the point of the append or insert edit. The sudden increase in bit error rate is due to the fact that a new equalizer setting for the appended or inserted data cannot be automatically adjusted rapidly enough from the prior equalizer setting to prevent the burst of bit errors.

In addition, overwriting deep gap depth recordings with a shallow gap depth head, or vice versa, as when performing an append or insert edit process, may also result in bit error rate degradation due to the incompatible recording depths in the medium.

In the investigation of recording head efficiency it has been found that a deep gap head generally has a lower efficiency and a faster high frequency efficiency roll-off when compared to the efficiency and roll-off of a shallow gap head. This difference in efficiency results in the inconsistent record process transfer functions and tape magnetization patterns of previous mention. It also has been found that, in order to perform a more efficient recording process, a deep gap depth head requires a greater amount of record drive current, and an increase in the amount of overshoot in the digital waveform at each transition. As applied herein, "overshoot" is that portion of a squarewave waveform which rises above the "flattop" of the waveform, and then decreases to the flattop value, and is expressed in percent of level increase over the flattop value. As the head wears and the depth of the gap decreases, successively less record drive current and overshoot are required to maintain the same strength and switching time of the head magnetic field and to provide a constant recorded magnetization depth profile in the recording medium. This in turn allows subsequently maintaining an optimum and constant equalizer setting corresponding to a minimum error rate during the reproduction process.

In the past, prior art recording/reproducing systems employing pre-equalization recording processes and equalization reproducing processes, purposely attempted to record perfect square waves representing the digital data. To this end, the overshoot amount of the pre-equalization was kept fixed for all heads. The typical record amplifier circuit included a resistor trim pot connected in parallel across the primary of the record transformer, whereby the resistance was pre-adjusted to cause the record output stage to produce square waves with some fixed value of overshoot at each transition. However, as discussed above, it has been found that contrary to typical practice, it is desirable to produce an automatically adjusted overshoot when recording with different record heads with varying gap depths to compensate for the varying high frequency characteristics of such heads.

It follows that it would be highly desirable to provide means for shaping the record current waveform to compensate for the inherent head efficiency changes due to different head gap depths, whereby the recordings made in media by various different gap depth heads automatically are made equivalent and compatible.

SUMMARY OF THE INVENTION

The present invention overcomes the compatibility problems of previous discussion by providing an adaptive pre-equalization technique which compensates for head efficiency change as the head gap depth decreases due to wear, by adaptively adjusting the amount of transition overshoot in accordance with the record drive level signal. In one embodiment using a switching type of output driver, that is, a switching type of record amplifier, the technique takes advantage of the fact that the electrical load formed by the inductive/capacitive nature of a record output stage, including the rotary transformer and record heads, produces a resonance and thus the overshoot phenomenon after each transition. If the resistive losses in the load are increased, the tendency for the circuit to produce an oscillation is damped, which results in reducing the overshoot. In actuality, it is the amplitude of the first cycle of the damped resonance waveform that is significant in applying the technique of the invention.

To this end, the transition overshoot of the record current is used to compensate the head efficiency loss at high frequencies, particularly in new heads with deep gaps. As the head gap depth decreases due to wear, head efficiency is increased and the high frequency roll-off is reduced. Less overshoot is required to make the recorded magnetic depth profile of a worn head comparable to the magnetic depth profile recorded in the medium by the new heads. Thus, recording compatibility is achieved by decreasing the record current overshoot at the digital signal transitions. Additionally, the different gap depth record heads of correspondingly different head efficiencies require different optimum record current levels to provide a maximum signal-to-noise ratio in the reproduced signal. Thus it has been found that the head gap depth can be "monitored" by means of the optimum record current level without actually measuring the gap depth of the individual head. It follows that the desired amount of overshoot can be adaptively adjusted in accordance with the head gap depth during the recording process by tracking the record current overshoot to the optimum record current level derived by adjusting the record drive level signal. Recording compatibility of the different gap depth heads thus is achieved in the recording process using the existing normal record current optimization procedure. The effectiveness of the compensation may be Corroborated by monitoring the resulting smaller, or zero, equalizer setting change when reproducing a sequence of data from a recorded medium with sections recorded by different record heads.

As contemplated by the invention, the desired amount of overshoot is provided in accordance with a relationship between the record drive level signal($V_R$) and an overshoot control voltage herein exemplified by a bias voltage ($V_B$ or $V_B'$). In one embodiment, $V_B$ controls the resistance of a variable resistance circuit disposed after a switching record amplifier in the record output stage. The relationship is experimentally determined using a matrix method, and is applied in the form of a look-up table correlating the optimum $V_B$ for a given $V_R$, which may be expressed by, but not limited to, a first order approximation. Thus the relationship may be expressed mathematically as a linear equation essentially in a slope-intercept form. The slope represents the gain of the corresponding "equation" circuit while the intercept represents the offset. The equation includes a preferred set of values corresponding to a proper slope/intercept which produces a correspondingly correct transition overshoot for each current level value at which the system is optimized. By way of example only, in this embodiment, a preferred equation is, $V_B = a - bV_R$, wherein 'a' and 'b' are selected constants which will make the rise and fall times of the record head magnetic field more consistent for different gap depth heads through controlling the record current overshoot. Thus, for example 'a' may be an offset voltage and 'b' may be a gain factor relating $V_R$ to $V_B$ or $V_B'$. $V_R$, $V_B$, and $V_B'$ are identified fully hereinafter in the drawings and the discussion thereof.

In an environment of an output stage of a record amplifier circuit, the above embodiment of the invention controls the amount of record current overshoot during a digital data transition by a damping resistance circuit disposed in parallel in the output stage of the record amplifier. In one embodiment, the damping resistance circuit is formed of a field effect transistor (FET) with source-to-drain resistance controlled by the applied bias voltage $V_B$. The FET bias voltage is mathematically related to the record drive level signal $V_R$ used to control the record current. In a first order approximation, the linear relationship between these two voltages is derived from a study of the head efficiency loss, and is represented herein as the experimentally derived equation $V_B = a - bV_R$ of previous mention. Without explicit information concerning the gap depth of a record head, the amount of record current transition overshoot is automatically adjusted according to the optimum record current level, derived via the adjusted record drive level signal to thus achieve complete recording compatibility between record heads of different gap depths. There is a variability in the FET from sample-to-sample which is not accounted for in an equation circuit with a fixed gain. Therefore, a manually set variable gain element for providing an "initialization" adjustment is incorporated in the equation circuit of previous mention by way of example.

In a modification of the embodiment, the damping resistance circuit is formed of digital diode-switched combinations of fixed resistors. An interface circuit receives the record drive level signal $V_R$ and provides the bias voltage $V_B$. An analog-to-digital (A/D) converter provides a selected plurality of digital states corresponding to respective voltage levels of the bias voltage $V_B$ of the FET circuit of previous discussion. The digital state signals enable and/or disable selected transistors which, in combination with respective diodes, insert selected resistors in parallel with the record transformer to provide the different values of damping resistance in the manner described above relative to the FET embodiment. In the embodiment employing the diode-switched digital circuit however, the resistance values are changed in discrete steps, rather than changed continuously.

In an alternative embodiment, using a linear record amplifier in place of the switching record amplifier, the overshoot is obtained at a low signal level prior to the record amplifier by summing a capacitive transient and the basic data square wave at each transition. Considering the frequency domain, the control signal corresponding to the bias voltage produces the desired overshoot by correspondingly increasing the high frequency response in the path of the digital signal. This replaces the damped output ringing of the previous embodiment. In this alternative embodiment the desired amount of overshoot is provided in accordance with a relationship between the record drive level signal $V_R$ and the overshoot control signal equivalent to the bias voltage $V_B$ and designated $V_B'$. In particular, the control signal $V_B'$ is derived from the record drive level signal $V_R$ via, for example, the equation (and equation circuit) of previous discussion or, in a more sophisticated system, by means of a microprocessor circuit and a selected polynomial function in software. The overshoot control signal $V_B'$ controls the gain of a voltage-controlled amplifier which receives the digital signal and which, in turn, supplies the additional capacitive transient to be summed with the digital data signal waveform. The digital data signal with desired overshoot then is supplied to a linear record amplifier via a voltage-controlled amplifier whose gain is determined in essence by the record drive level signal $V_R$. The linear record amplifier then provides an amplified digital data signal whose transitions include an overshoot determined by the value of the overshoot control signal and thus by the record drive level signal $V_R$.

In the higher order approximation mentioned above, the microprocessor circuit includes digital-to-analog converters to control the voltages of $V_B'$ and the record current corresponding to the record drive level signal. Any mathematical relation, linear or nonlinear, between these two voltages may be realized by software. Thus, a more general expression for the relationship of $V_B$ or $V_B'$ to $V_R$ is shown by, $$F(V) = a_0 V^n + a_1 V^{n-1} + a_2 V^{n-2} \ldots + a_n$$

where $a_0 \ldots a_n$ are coefficients of a polynomial, V is related to $V_R$ and $V_B$ or $V_B'$ is related to F(V).

DESCRIPTION OF THE PREFERRED EMBODIMENTS

Figure 1:
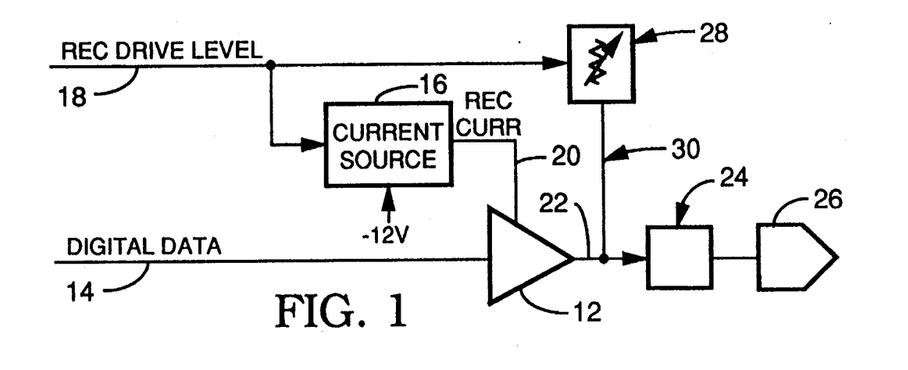
FIG. 1 is a block diagram of the invention as combined in the environment of a switching type record amplifier in a record output stage of a digital data recording apparatus.

Referring to FIG. 1, a digital data signal which is to be recorded on a selected recording media is supplied to a conventional switching type record amplifier 12 via a data bus 14. A record drive level signal, herein represented by the notation $V_R$, is supplied to a constant current source 16 via a line 18, and the resulting related record current signal is supplied via a line 20 to a current input of the switching record amplifier 12 in generally conventional fashion. The record amplifier 12 supplies the digital data signal to be recorded on the medium, in the form of a selected suitably modulated digital signal, via a data bus 22. The amplitude of the record current signal on line 20 is adjusted as in a conventional record current optimization process to provide a maximum signal-to-noise ratio in the signal recovered from the medium in a subsequent reproduce process. The digital data signal is recorded on the medium via record transformer means 24, which includes rotary transformer means, and selected record heads 26.

In accordance with an embodiment of the invention, the record drive level signal $V_R$ also is supplied via the line 18 to a damping resistance circuit 28 which operates to adaptively control the resistance applied across a primary winding of the record transformer means 24, to thus adaptively control the amount of overshoot at a data signal transition in accordance with the value of the record drive level signal $V_R$. The control is depicted in FIG. 1 via a line 30 and is further described in the FIGS. 2, 3. In effect, the variation in the applied resistance correspondingly varies the amount of damping applied to the inherent oscillation generated in the inductive/capacitive elements of the record output stage, and thus the degree of change in the overshoot value. The value of overshoot generally has a non-linear relationship relative to the bias $V_B$ voltage, as is further discussed below relative to FIG. 6.

Figure 2:
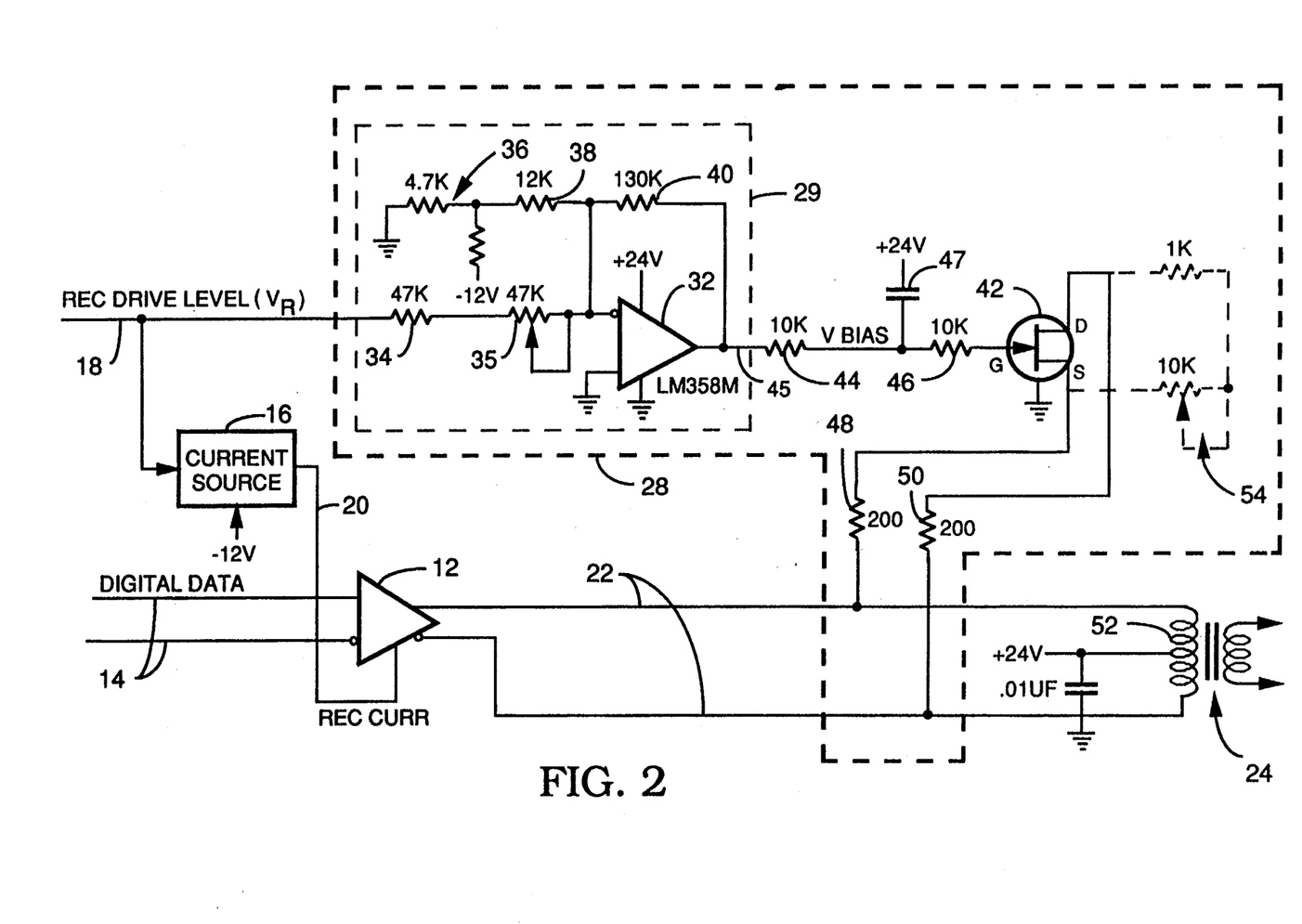
FIG. 2 is a schematic diagram of an embodiment of the invention in an environment such as depicted in FIG. 1.

An embodiment of the invention is illustrated in FIG. 2, in which the damping resistance circuit 28 comprises a field effect transistor (FET) whose source-to-drain resistance is controllable by a gate voltage corresponding to the bias voltage $V_B$. In the figures, similar components are similarly numbered. As in FIG. 1, the digital data signal is supplied to the record amplifier 12 and thence to the record transformer means 24 via the data bus 22. The record drive level signal $V_R$ is supplied to the damping resistance circuit 28 and, in particular, to an interface circuit 29 comprising the equation circuit of previous mention. The circuit 29 provides the bias voltage $V_B$ which is, in effect, an overshoot control signal for controlling the value of the resistance applied to the record transformer 24. The interface circuit 29 thus adapts the analog characteristics of the signal $V_R$ to the requirements of the damping resistance circuit 28 and, in FIG. 2, to the input requirements of the field effect transistor 42.

More particularly, the signal $V_R$ is supplied to the inverting input of an operational amplifier 32 via a resistor 34 and a variable resistor or trim pot 35. The trim pot 35 provides an initial adjustment of the overshoot to correspond it to a specific record drive level voltage, as further shown by the FIG. 6 below. The non-inverting input of the amplifier 32 is grounded. A pair of resistors serially coupled between ground and −12 volts define a voltage divider 36 with the center junction coupled to the inverting input of the amplifier 32 via a resistor 38. The output of the amplifier 32 is fed back to the inverting input via a resistor 40, and also is supplied to the base, or gate electrode, of a FET 42 via a line 45 and a serial pair of resistors 44, 46. The junction of the resistors 44, 46 is connected to the source of +24 volts (center tap of transformer 52) via a capacitor 47. The source and drain electrodes of the FET 42 are coupled via respective resistors 48, 50 to the lines 22 extending to a primary winding 52 of a record output transformer of the record transformer means 24. The resistors 48, 50 limit the dissipation of the FET 42, and locate it centered at virtual AC ground at the winding 52 center tap. The assignment of source and drain connections is arbitrary since the circuit is balanced and the FET is required to be symmetrical; that is, the source and drain are interchangeable without a change in effective resistance. As depicted in dotted line, an adjustable resistance circuit 54 may be coupled across the source and drain electrodes and may be used in place of, or in addition to, the adjustable trim pot 35. Either of resistances 35 or 54 allows the initial adjustment of the overshoot to correspond with a specific record drive voltage, by compensating for sample-to-sample differences in the various components involved in delivering the record signal to the medium, such as the FET 42, losses in the output transformer, the rotary transformer and the head itself.

As previously mentioned, the FET bias voltage $V_B$ is mathematically related to the voltage used to control the record current level, that is, the record drive level signal $V_R$ on the line 18. In a first order approximation, an equation corresponding to a linear relationship between these two voltages was derived experimentally from a study of the high frequency head efficiency losses of record heads of different gap depths varying from deep new heads through shallow worn heads. The specific linear equation derived is $V_B = 51.55 - 2.275 V_R$, wherein the previous notations a' and b' are equal to 51.55 and 2.275 respectively. The equation is depicted graphically in FIG. 4 and discussed below relative thereto. A more general expression also is discussed below and illustrated as a higher order approximation in FIG. 8.

The record drive level signal $V_R$ determines the amplitude of the record current signal on line 20 and thus of the record current level supplied to the record output stage, to thereby determine the amplitude of the record drive applied to the record heads. It is this parameter which is optimized for gap depth when performing the record current optimization process of previous mention. The same signal $V_R$ that determines the amplitude of the record current, herein is used to adaptively control the resistance of the FET 42 of FIG. 2. Since the relationship between the record drive level signal $V_R$ and the bias voltage $V_B$ has been predetermined and is reflected in the values of the resistors, etc., in the damping resistance circuit 28, the amount of transition overshoot produced by the record output stage and record heads is related to the depth of the record head gaps. That is, given a new head and a corresponding deep gap, the damping resistance circuit 28 of the invention will produce a large value of overshoot. Conversely, given a worn head with a corresponding shallow gap, the circuit 28 will produce a very small or zero value of overshoot. Head gap depths intermediate the deepest and shallowest gaps cause the circuit 28 to adaptively produce correspondingly intermediate values of transition overshoot. In the operation of the circuit 28 the value of overshoot produced is non-linearly related to the amount of damping applied across the record transformer means.

Figure 3:
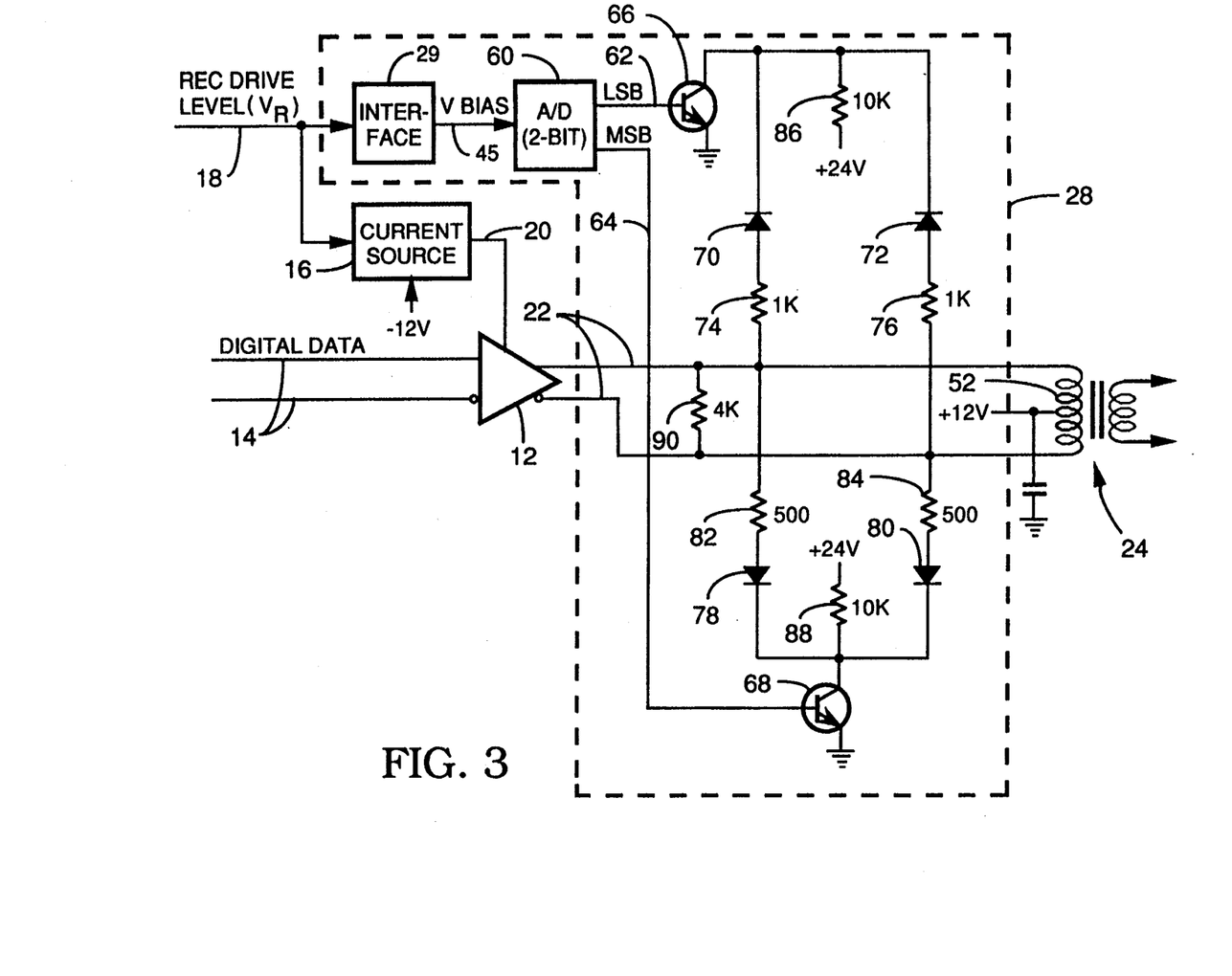
FIG. 3 is a schematic diagram of an alternative embodiment of the invention in an environment such as depicted in FIG. 1.

FIG. 3 illustrates an alternative embodiment of the invention, wherein the damping resistance circuit 28 comprises a digital, diode-switched, fixed resistor network in place of the FET 42, for providing the change in resistance across the record transformer means 24 to correspondingly adaptively vary the amplitude of the overshoot as a function of the record drive level signal $V_R$, and thus of the record head gap depth. Instead of the continuously variable resistance, and thus continuously variable value of overshoot, the diode-switched resistor network of FIG. 3 provides, by way of example only, four resistance states that are derived via one fixed and two sets of switched resistors. Thus, the overshoot values are changed in steps rather than continuously. It is readily apparent that other numbers and combinations of resistors and diodes are possible. By way of example, with a lifetime of 2000 hours and a change of record drive level signal every 100 hours to maintain optimum efficiency, a diode-switched resistor network capable of providing 20 resistance states would be required in the circuit of FIG. 3.

In FIG. 3, the record drive level signal $V_R$ is supplied to the interface (equation) circuit 29 previously shown and described in FIG. 2, and which provides, in effect, the resistance control signal of previous mention in the form of the bias voltage $V_B$. As may be seen, the circuit of FIG. 3 provides a minimum number of resistance states to simplify the description herein. The bias voltage $V_B$ is supplied via the line 45 to an A/D converter 60 of the damping resistance circuit 28. The interface circuit 29 thus adapts the analog characteristics of the signal $V_R$ to the requirements of the A/D converter 60. The converter supplies a least significant bit (LSB) gate signal and a most significant bit (MSB) gate signal on lines 62, 64, respectively. The gate signals LSB and MSB are supplied to the base electrodes of respective transistors 66, 68, whereby one or the other transistor can be enabled, both can be enabled, or both can be disabled, to provide four switching states. The emitter electrodes of each transistor 66, 68 are coupled to ground and the collector electrodes are coupled to a respective diode/resistor network. In particular, the collector electrode of transistor 66 is coupled to a pair of diodes 70, 72 and thence to one end of respective resistors 74, 76 of, for example, 1K ohms each. The free ends of the resistors 74, 76 are coupled to respective lines 22 extending to opposite ends of the primary winding 52 of the record transformer means 24.

Likewise, the collector electrode of the transistor 68 is coupled to a pair of diodes 78, 80 and thence to one end of respective resistors 82, 84 of, for example, 500 ohms each. The free ends of the resistors 82, 84 are coupled to the respective junctions of resistors 74, 76 with lines 22.

The collector/diode junctions of each of the transistors 66, 68 also are coupled to one end of respective resistors 86, 88 of, for example, 10K ohms, and the free ends are coupled to a source of +24 volts. The resistors 86, 88 and the +24 volt source insure that when the resistor sets 74,76 and 82,84 are removed from the circuit, the respective diodes are turned off. A resistor 90 of, for example, 4K ohms is coupled across the lines 22 from the switching record amplifier 12 and provides the resistance value at such time as the diodes are all disabled and the resistors 74, 76 and 82, 84 are removed from the circuit. The value of the resistor 90 is an exemplary value and the resistor 90, and thus the value, preferably may be replaced and determined by a potentiometer for initial standardization.

By way of example only, one combination of values for the various pairs of resistors are illustrated in FIG. 3, although it is to be understood that other numbers of resistors and/or combinations of resistor values may be used instead. Furthermore, if more than four steps or levels of overshoot values and corresponding levels of resistance are desired, additional resistors, diodes, transistors and digital gate signals may be added to the circuit of FIG. 3 in the manner exemplified by the basic circuitry of FIG. 3.

As may be seen, in the circuit of FIG. 2 the analog record drive level signal $V_R$, in effect, is supplied to the record heads via the record transformer means 24, also in effect continuously controls the resistance of the FET 42 and thus of the overshoot amplitudes for any head gap depth. The overshoot control signal in actuality is formed of the signal $V_B$. In the circuit of FIG. 3, the analog record drive level signal $V_R$ is adapted via the interface circuit 29, and then converted via the A/D converter 60 to the 2 bit digital signals LSB, MSB on the two lines 62, 64 which produce the four different states of previous mention. The diode-switched resistance combinations determined by the different digital states thereby provide the four different levels of damping and the corresponding different overshoot amplitudes. Thus, in effect, the LSB and MSB digital signals of FIG. 3 are derived from the same overshoot control signal, that is, the bias signal $V_B$, that is shown in FIG. 2.

By way of example, the following table illustrates the various values of voltage and resistance for the four digital states of the diode-switched circuit of FIG. 3.

| Gap Depth | $V_R$ | R(Ω) | LSB | MSB |
|---|---|---|---|---|
| deep | 15 | 4000 | 0 | 0 |
|  | 14 | 1333 | 1 | 0 |
|  | 13 | 800 | 0 | 1 |
| shallow | 12 | 571 | 1 | 1 |

As may be seen from the FIGS. 2, 3 and the table, when the record head has a deep gap, a larger value of resistance is provided across the record output stage to provide the least amount of damping and thus the largest overshoot amplitude. Likewise, the record head with a deep gap requires the greatest amount of record drive level signal $V_R$. As the head wears, the invention of FIGS. 2, 3 automatically provides a correspondingly smaller amount of record drive level $V_R$ and a smaller value of resistance across the record output stage to produce a greater amount of damping and a smaller overshoot amplitude, as required by the shallower gap depth.

Figure 4:
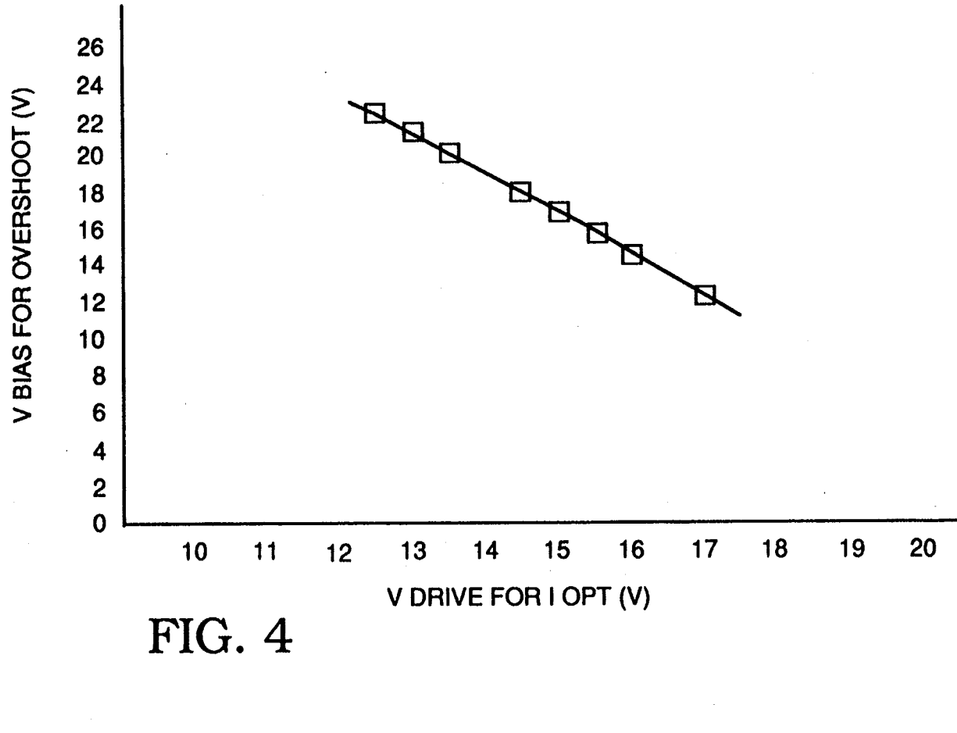
FIG. 4 is a graph of a curve depicting the linear relationship between the FET bias voltage, $V_B$, and the record current level signal, $V_R$, derived from tests of high frequency head efficiency losses.

Referring to FIG. 4, there is illustrated a curve depicting the linear relationship between the bias voltage $V_B$ and the record drive level signal $V_R$, derived experimentally in the first order approximation and expressed mathematically by the equation $V_B = 51.55 - 2.275\ V_R$. The equation was derived for a specific record head design used in the video and data professional recorder product lines manufactured by Ampex Systems Corporation, Redwood City, Calif. To this end, tests were run on a group of record heads of different gap depths while comparing the optimum record drive level signals of various values with various bias voltages to provide the optimum characteristic. That is, the best relationship of $V_R$ to $V_B$ which provides the most consistent equalizer settings upon signal reproduction from the media. If there are objectionable variations in, for example, the equalizer settings during the reproduction process, certain parameters are changed in the tests which remove the undesirable variations.

As may be seen, in the first order approximation, the circuit is operated in the linear range, generally in the range of record drive levels of from approximately 12 volts through 17 volts. The corresponding voltage for $V_B$ in the circuit of FIG. 2 ranges from approximately 23 volts through 13 volts. The percent of overshoot ranges from approximately zero percent for $V_R$ of about 11.5 volts, to 60 percent for $V_R$ of about 16.5 volts dependent of course upon the particular operating characteristics of the respective FET.

Figure 5:
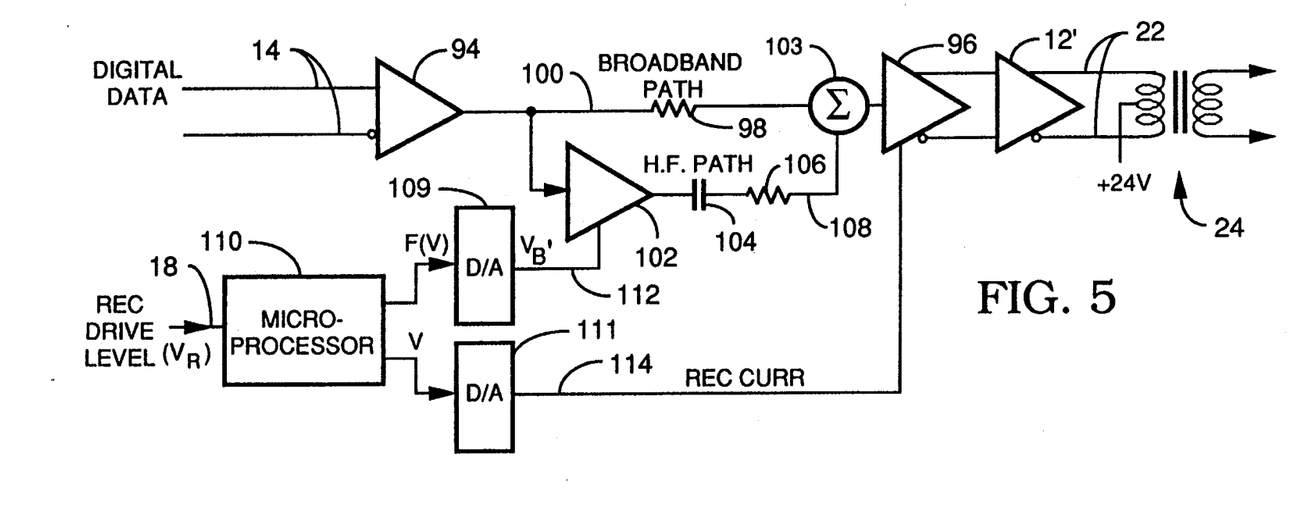
FIG. 5 is a block/schematic diagram of a further embodiment of the invention in the environment of a linear type of record amplifier in a record output stage of a digital data recording apparatus.

FIG. 5 illustrates a further embodiment of the invention in which the switching record amplifier 12 of the record output stage depicted, for example, in FIGS. 1-3 is replaced by a linear type of record amplifier 12'. As is well known, a switching amplifier provides a basic switching function, wherein it responds to instantaneous changes in digital signal levels without amplification of the details of the signal levels. The linear amplifier on the other hand, does amplify the details of the signal applied to its input. Thus, in the environment of a linear type of record amplifier, a low level signal representative of the transition overshoot may be applied to the input of the linear record amplifier, and its effects are amplified and supplied at the output of the linear amplifier.

Thus, in FIG. 5, wherein similar components of previous description are similarly numbered, the digital data signal is supplied to a line receiver amplifier 94 via the data bus 14. The digital signal is supplied to a voltage controlled amplifier (VCA) 96 via a resistor 98 in a broadband digital data signal path 100. The digital signal from the line receiver amplifier 94 also is supplied to another VCA 102 which, in turn, supplies the additional capacitive transient which is to be summed with the digital data signal waveform, to one input of a summing junction 103 via a capacitor 104 and a resistor 106 of a high frequency digital data signal path 108. The other input of junction 103 receives the digital data signal via the path 100, whereby the summing junction 103 supplies a combined digital signal consisting of the broadband digital data signal and the high frequency digital data signal corresponding to the desired overshoot, to the input of the VCA 96.

The record drive level signal $V_R$ is supplied via the line 18 to a block 110 which, in FIG. 5, may comprise a microprocessor-controlled computer circuit in which the computer controls a polynomial function in software. The microprocessor circuit 110 supplies output signals V and F(V) to respective digital-to analog (D/A) converters 111, 109. The D/A converter 109 provides an overshoot control signal representative of the desired percentage of overshoot, to a gain control input of the VCA 102 via a line 112. The overshoot control signal on line 112 is equivalent to the overshoot control signal $V_B$ of FIGS. 2, 3 and is designated $V_B'$. The D/A converter 111 provides a record current signal corresponding to the optimized record current level delivered to the record heads, to a gain control input of the VCA 96 via a line 114. The output of the VCA 96 is supplied to the linear record amplifier 12' of previous mention, which supplies the amplified digital data signal with desired overshoot to the record transformer of the record transformer means 24 via the lines 22. Thus, the transitions in the digital data signal include an overshoot determined by the value of the overshoot control signal and thus by the record drive level signal $V_R$.

It is to be understood that the microprocessor circuit 110 with D/A converters 109, 111 may be replaced with the equation circuit 29 and current source 16 of FIGS. 1-3, depending upon the degree of circuit sophistication desired. Thus, for example, the equation circuit 29 may be used in the embodiment of FIG. 5 if a first order approximation relationship is desired between the signals $V_B'$ and $V_R$. On the other hand, the microprocessor circuit 110 with converters 109, 111 may be used in the embodiment of FIGS. 1-3 if a higher order approximation relationship is desired between the signals $V_B$ and $V_R$. Thus, in the embodiments of FIGS. 1-3 or 5 the circuit 29 and circuits 110, 109, 111 are interchangeable, wherein the microprocessor circuit 110 operates via a polynomial function in software that determines the relationship of the D/A converter output voltages V and F(V) as a function of the record drive level signal $V_R$. The microprocessor circuit 110 therefore may provide a second, third, or higher order approximation relationship. To this end, in FIG. 5, the microprocessor circuit 110 selectively controls the voltages V and F(V) supplied to the D/A converters 109, 111, whereby any mathematical relation (both linear and nonlinear) between the voltages V and F(V) may be realized by software programming. The general expression of such polynomial function is, $$F(V)=a_0V^n+a_1V^{n-1}+a_2V^{n-2}\ldots+a_n$$

wherein $a_0\ldots a_n$ are coefficients of a polynomial, V is related to $V_R$ and $V_B$ or $V_B'$ is related to $F(V)$.

Thus, as in the embodiment of previous discussion in FIGS. 1-3, the embodiment of FIG. 5 provides circuitry which tracks the record current overshoot occurring during a digital data signal transition to an optimum record drive level signal, wherein the latter signal is related to the head gap depth.

Figure 6:
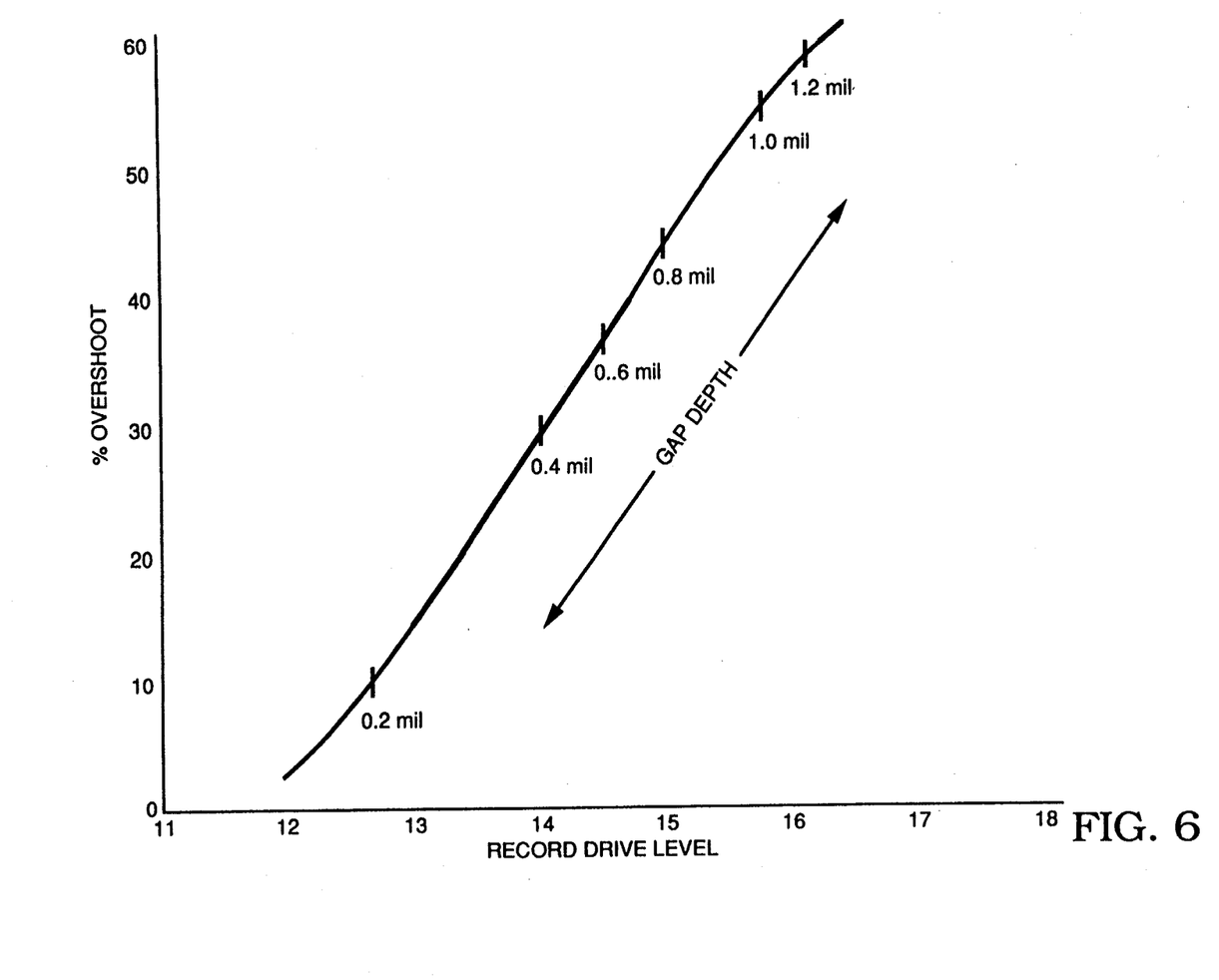
FIG. 6 is a graph of a curve corresponding to a record head with various gap depths, depicting the relationship of percent overshoot to the record drive level signal.

FIG. 6 depicts a curve taken of a group of record heads in a helical scanner assembly whose gap depths were 1.2, 1.0, 0.8, 0.6, 0.4 and 0.2 mils. The curve illustrates the relationship between the record drive level signal in volts and the transition overshoot in percent, for the various selected record head gap depths, to provide compatible recordings on the media. The nearly linear curvature depicted in FIG. 6 is typical of the near-cancellation of two highly non-linear relationships; FET resistance versus $V_B$ and percent overshoot versus FET resistance. Because of this near-cancellation, $V_B$ can be an approximately linear function of $V_R$.

It may be seen in FIG. 6 that the head with deeper gaps requires larger values of the record drive level signal while also requiring larger values of overshoot. Conversely, the worn record head with shallower gap depths requires substantially less record drive levels and overshoot values approaching zero. In the initialization process of previous mention in FIG. 3 employing the trim pot 35 (or 54), a selected record drive level signal $V_R$ of 15.5 volts for example is applied to the circuit and the trim pot is adjusted for an overshoot control signal which provides an overshoot of 50 percent. This initial adjustment essentially calibrates the circuit such that it operates along a selected curve such as the curve of FIG. 6. By way of example only, a first order approximation is provided by using the linear equation of previous discussion to obtain a least mean square fit to the curve in FIG. 6.

However, the relationship between the record drive level signal (or the bias voltage) is not a linear function due in part to the non-linearity of, for example, the damping resistance in the circuits of FIGS. 1-3. Two reasons for the non-linearity of percent overshoot versus, for example, FET resistance, are the presence of fixed damping losses, representable by fixed parallel equivalent resistance across the FET and fixed series resistance in the FET leads, as well as the basic dependency of overshoot amplitude on the over-all loss resistance.

Figures 7, 8:
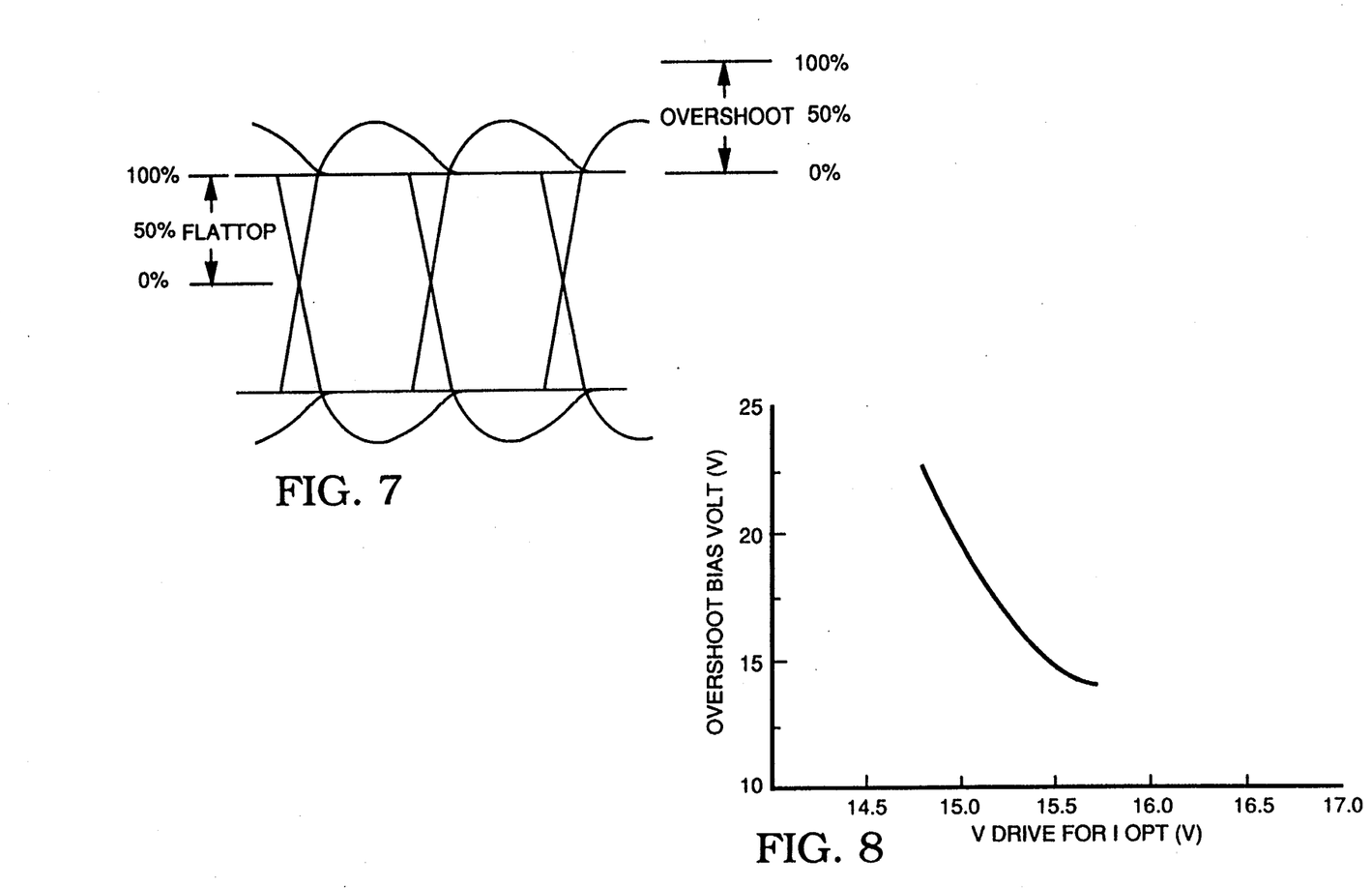
FIG. 7 is a graph of the record current eye pattern depicting the application of overshoot to the digital data waveform.
FIG. 8 is a graph of a curve depicting the relationship of the optimum overshoot control signal versus the optimum record drive level signal for a selected record head, for a nonlinear higher order approximation relationship in processes where cancellation of nonlinearities is imperfect or non-optimum.

FIG. 7 illustrates by way of example, digital data with overshoot displayed on an oscilloscope with synchronization by the "data dock." Such a display is called an eye pattern and is commonly used to study data processing waveforms. The data of this example is a test square wave at 13.33 megahertz (MHz) or "⅓ Nyquist" where the data clock is 80 MHz and the Nyquist frequency is 40 MHz (defined by the onset of aliasing problems). Overshoot as discussed herein is related to the "flattop" level of the square wave, or the level reached after the overshoot and ringing are completely damped out. Since the record waveform is an alternating current waveform, the rise from zero current to the flattop current in one direction is taken as 100 percent. Then the overshoot is measured to the same scale where zero overshoot is at the flattop level.

FIG. 7 is drawn to illustrate an overshoot of approximately 50 percent. Ringing in the waveform is not shown, for the sake of simplification.

FIG. 8 depicts the relationship of the overshoot control signal $V_B'$ versus the optimum record drive level signal $V_R$ for a higher order approximation configuration such as shown in FIG. 5, employing the microprocessor circuit 110 with D/A converters 109, 111. The curve represents a polynomial function in software realized via the microprocessor circuit 110 and expressed, for example, by the general equation of previous discussion, and replaces the linear relation of FIG. 4.

Although the invention is described herein in terms of various preferred embodiments, it is to be understood that other combinations of circuits may be employed in place of, for example, the specific FET resistance circuit of FIG. 2, the diode-switched resistance circuit of FIG. 3, and/or the linear amplifier/high frequency control signal path of FIG. 5. In addition, various modifications to the circuits and to the specific values depicted herein by way of example for the electrical components also may be made within the scope of the invention.

These and additional features and advantages will be apparent from the description and the drawings herein, and thus it is intended that the scope of the invention be defined by the following claims and their equivalents.

What is claimed is:

1. A method of providing digital data signal recording compatibility between record heads of different gap depths, said record heads being supplied via record amplifier means in a record output stage with an optimized record current signal derived from a record drive signal, the digital data signal being formed of successive digital data bits having transitions, comprising the steps of:

generating an overshoot control signal in response to the record drive signal, wherein the value of said record drive signal is proportional to the gap depth of the record head; and producing a selected overshoot during the transitions of the digital data signal in response to said overshoot control signal, wherein the amount of overshoot is proportional to any changes in the record head gap depth.

2. The method of claim 1 wherein the step of producing includes:

applying a selected resistance to the record output stage; and varying the selected resistance in accordance with the record drive signal in response to the overshoot control signal.

3. The method of claim 2 wherein:

said step of applying includes providing said selected resistance during the digital data signal transitions; and said step of varying includes varying the degree of overshoot as a function of the resistance and of the value of said record drive signal and thus in proportion in changes in the record head gap depth.

4. The method of claim 2 wherein the overshoot control signal has a linear relationship with the record drive signal defined by the equation, $V_B = a - b\, V_R$, wherein $V_B$ is the overshoot control signal and $V_R$ is the record drive signal, and a and b are selected constants which will make the rise and fall times of the record head magnetic field consistent for different gap depth heads.

5. The method of claim 2 wherein a relationship between the overshoot control signal ($V_B$ or $V_{B'}$) and the record drive signal ($V_R$) is a higher order of approximation derived via a microprocessor in response to a polynomial function in software, and is exemplified by the expression $$F(V) = a_0 V^n + a_1 V^{n-1} + a_2 V^{n-2} \ldots a_n$$

wherein $a_0 \ldots a_n$ are coefficients of a polynomial, V is related to $V_R$ and $V_B$ or $V_{B'}$ is related to F(V).

6. The method of claim 1 wherein:
the step of generating includes providing a digital signal having high frequency components in response to the overshoot control signal and, applying the high frequency components of the digital signal to said digital data signal at said transitions; and
the step of producing includes linearly amplifying the combined digital data signal and the high frequency components of the digital signal to provide the selected overshoot as a function of the value of the record drive signal.

7. The method of claim 6 wherein the step of applying includes:
providing said digital signal as a capacitive transient signal in response to the overshoot control signal; and
summing the capacitive transient signal with the digital data signal during the transitions therein to provide the combined digital data signal with selected overshoot.

8. The method of claim 7 wherein the step of producing includes amplifying the combined digital data signal with selected overshoot in response to the optimized record current signal derived from said record drive signal.

9. Apparatus for providing digital data signal recording compatibility between record heads of different gap depths, said record heads being supplied via record amplifier means in a record output stage, with an optimized record current signal derived from a record drive signal, said digital data signal being formed of successive digital data bits having transitions, comprising:
means including said selected record amplifier means, for adaptively applying an overshoot value to the digital data signal during transitions therein, which overshoot value is proportional to the value of said record drive signal and said record drive signal is proportional to the record head gap depth; and
said means for applying includes damping means coupled to the record output stage for applying a variable resistance across the output stage automatically in response to said record drive signal and thus in proportion to changes in said record head gap depth.

10. The apparatus of claim 9 wherein the selected record amplifier means comprises a switching type of record amplifier, and the means for applying includes:
means responsive to said record drive signal for selectively varying the resistance applied across said output stage as the function of said record head gap depth.

11. The apparatus of claim 10 wherein said damping means includes:

transistor means whose resistance varies in relation to said record drive signal; and
wherein the value of said resistance determines the degree of overshoot produced in the digital signal.

12. The apparatus of claim 11 wherein:
said transistor means comprises a field effect transistor; and
said means for selectively varying includes amplifier means receiving said record drive signal, for supplying an overshoot control signal to the field effect transistor which determines the variation in the resistance of the field effect transistor.

13. The apparatus of claim 11 wherein the means for selectively varying includes a microprocessor receiving said record drive signal, for supplying an overshoot control signal as a function of said record drive signal, wherein the overshoot control signal and the record drive signal have a selected mathematical relationship derived via the microprocessor in response to a polynomial function in software.

14. The apparatus of claim 11 wherein the overshoot control signal and the record drive signal have a linear relationship defined by the equation, $$V_B = a - b V_R$$

where $V_B$ and $V_R$ are the overshoot control signal and the record drive signal, respectively, and a and b are selected constants which will make the rise and fall times of the head magnetic field consistent for different gap depth heads.

15. The apparatus of claim 12 wherein:
said amplifier means includes an operational amplifier coupled at its inverting input to said record drive signal and providing the overshoot control signal at its output; and
said field effect transistor includes a gate electrode coupled to said overshoot control signal, and source and drain electrodes coupled across said record output stage via respective resistors.

16. The apparatus of claim 10 wherein said damping means includes:
first and second resistor means selectively coupled to said record output stage for applying said variable resistance across the output stage; and
said means for selectively varying includes electronic switch means responsive to the record drive signal for selectively coupling and uncoupling said first and/or second resistor means to and from said record output stage.

17. The apparatus of claim 16 including:
converter means for producing multiple digital overshoot control states representative of analog values of said record drive signal; and
said electronic switch means including transistor means for selectively coupling the first or the second resistor means, for coupling both the first and second resistor means, or for uncoupling both the first and second resistor means, in response to said multiple digital overshoot control states.

18. The apparatus of claim 17 including:
interface means including amplifier means receiving said record drive signal, for supplying an overshoot control signal which has a selected relationship relative to said record drive signal; and
wherein said converter means produces the digital overshoot control states in response to given voltage levels of the overshoot control signal.

19. The apparatus of claim 17 wherein the overshoot control states correspond to an overshoot control signal, and wherein a selected relationship between the overshoot control signal and the record drive signal is linear and is defined by the equation, $$V_B = 51.55 - 2.275\, V_R,$$

wherein $V_B$ is the overshoot control signal and $V_R$ is the record drive signal.

20. The apparatus of claim 9 wherein the selected record amplifier means comprises a linear type of record amplifier, and the means for applying includes:
   circuit means for generating an overshoot control signal along with said optimized record current signal;
   means responsive to said overshoot control signal for providing a digital signal having high frequency components representative of a desired value of overshoot; and
   means for combining the high frequency components of said digital signal with the digital data signal to produce a combined digital data signal with said desired value of overshoot.

21. The apparatus of claim 20 including:
   means for providing a broadband digital data signal; and
   wherein said combining means includes first amplifier means responsive to the record current signal, for applying said combined digital signal to the linear type of record amplifier.

22. The apparatus of claim 21 wherein the means for providing the high frequency components digital signal includes second amplifier means responsive to said overshoot control signal, and capacitor means coupled to said second amplifier means.

23. The apparatus of claim 20 wherein said circuit means includes:
   microprocessor means for generating, in response to a polynomial function in software, said overshoot control signal and said optimized record current signal with a selected relationship relative to the record drive signal; and
   D/A converter means responsive to the microprocessor means for generating the overshoot control signal and the optimized record current signal as analog signals.

24. The apparatus of claim 20 wherein said circuit means includes:
   an equation circuit including an operational amplifier for generating said overshoot control signal in accordance with a relationship defined by a preselected order of approximation; and
   current source means responsive to the record drive signal for generating said record current signal.

25. A method of providing digital data signal recording compatibility between record heads of different gap depths, said record heads being supplied via record amplifier means of a record output stage with an optimized record current signal related to a record drive signal, the digital data signal being formed of successive digital data bits having transitions, comprising the steps of:
   tracking the amount of overshoot occurring at the digital data signal transitions to the optimized record current signal and thus to the record drive signal, to adaptively adjust the amount of overshoot applied during the recording process in proportion to the head gap depth; and
   wherein the step of tracking includes;
      determining a proportional relationship between the value of the record drive signal and the head gap depth: and
      supplying to said record output stage an overshoot control signal which is proportional to said record drive signal and which provides said adaptive adjustment in proportion to the head gap depth.

26. The method of claim 25 wherein the step of supplying includes the step of:
   applying, in response to said overshoot control signal, variable values of resistance across the record output stage, wherein the value applied provides the amount of overshoot required by the instant record head gap depth to provide said recording compatibility.

27. The method of claim 25 wherein the step of supplying includes the steps of:
   generating a capacitive transient signal of high frequency components representative of the amount of overshoot corresponding to the instant head gap depth;
   combining the capacitive transient signal with the digital data signal to provide a combined digital data signal with the overshoot; and
   applying the combined digital data signal with the desired overshoot to the record amplifier means of the record output stage.

* * * * *